(12) United States Patent
Gonzalez Martin et al.

(10) Patent No.: US 12,109,762 B2
(45) Date of Patent: Oct. 8, 2024

(54) DIMENSIONAL COMPENSATIONS FOR ADDITIVE MANUFACTURING

(71) Applicant: Hewlett-Packard Development Company, L.P., Spring, TX (US)

(72) Inventors: Sergio Gonzalez Martin, Sant Cugat del Valles (ES); Manuel Freire Garcia, Sant Cugat del Valles (ES); Ismael Fernandez Aymerich, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 544 days.

(21) Appl. No.: 17/426,580

(22) PCT Filed: Apr. 30, 2019

(86) PCT No.: PCT/US2019/029833
§ 371 (c)(1),
(2) Date: Jul. 28, 2021

(87) PCT Pub. No.: WO2020/222786
PCT Pub. Date: Nov. 5, 2020

(65) Prior Publication Data
US 2022/0161498 A1    May 26, 2022

(51) Int. Cl.
*B29C 64/00* (2017.01)
*B29C 64/393* (2017.01)
*B33Y 50/02* (2015.01)

(52) U.S. Cl.
CPC ............ *B29C 64/393* (2017.08); *B33Y 50/02* (2014.12)

(58) Field of Classification Search
None
See application file for complete search history.

(56) References Cited

U.S. PATENT DOCUMENTS 9,017,589 B2   4/2015   Kritchman et al.
9,886,526 B2   2/2018   Huang
(Continued)

FOREIGN PATENT DOCUMENTS

WO   WO-2018140034 A1   8/2018

OTHER PUBLICATIONS

Liu, Yang et al."Investigation into the shrinkage in Z-direction of components manufactured by selective laser melting (SLM)", Int J Adv Manuf Technol, 2016, 11 pages.
(Continued)

*Primary Examiner* — Paul B Yanchus, III
(74) *Attorney, Agent, or Firm* — Michael Dryja

(57) ABSTRACT

In an example, a method includes receiving, at least one processor, object model data representing at least a portion of a first object that is to be generated by an additive manufacturing apparatus by fusing build material within a fabrication chamber. An indication of an amount of fused build material in a region of the fabrication chamber which is to be below the region in which the first object is to be generated may be determined and a dimensional compensation value to apply to the object model data representing the first object may be determined based on the determined indication. The determined dimensional compensation value may be applied to the object model data to derive modified object model data.

19 Claims, 4 Drawing Sheets

(56) References Cited

U.S. PATENT DOCUMENTS

| | | |
|---|---|---|
| 2016/0082666 A1 | 3/2016 | De Pena et al. |
| 2017/0368753 A1 | 12/2017 | Yang et al. |
| 2018/0117847 A1 | 5/2018 | Ohi |
| 2018/0311757 A1* | 11/2018 | Bucknell ............... B29C 64/264 |
| 2019/0105845 A1 | 4/2019 | Osawa |
| 2021/0046710 A1* | 2/2021 | Koopmans ............. B33Y 10/00 |

OTHER PUBLICATIONS

"Understanding HP's Multi Jet Fusion (MJF) Technology", Manufactur3d, 2018, 12 pages, https://manufactur3dmag.com/understanding-hps-multi-jet-fusion-mjf-technology/.

Wang, L. et al., "Voxel segmentation-based 3D building detection algorithm for airborne LIDAR data", PLoS ONE 13(12): e0208996, 2018, 18 pages.

* cited by examiner

DIMENSIONAL COMPENSATIONS FOR ADDITIVE MANUFACTURING

BACKGROUND

Additive manufacturing techniques may generate a three-dimensional object through the solidification of a build material, for example on a layer-by-layer basis. In examples of such techniques, build material may be supplied in a layer-wise manner and the solidification method may include heating the layers of build material to cause melting in selected regions. In other techniques, chemical solidification methods may be used.

BRIEF DESCRIPTION OF DRAWINGS

Non-limiting examples will now be described with reference to the accompanying drawings, in which.

DETAILED DESCRIPTION

Figure 1:
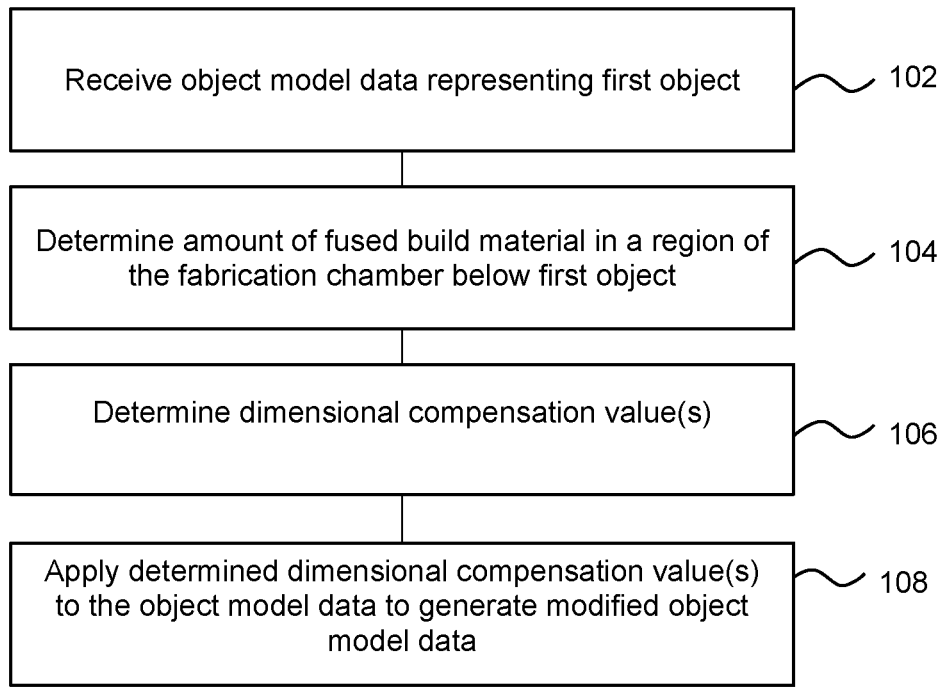
FIG. 1 is a flowchart of an example method of modifying object model data.

Additive manufacturing techniques may generate a three-dimensional object through the solidification of a build material. In some examples, the build material is a powder-like granular material, which may for example be a plastic, ceramic or metal powder and the properties of generated objects may depend on the type of build material and the type of solidification mechanism used. In some examples the powder may be formed from, or may include, short fibres that may, for example, have been cut into short lengths from long strands or threads of material. Build material may be deposited, for example on a print bed and processed layer by layer, for example within a fabrication chamber. According to one example, a suitable build material may be PA12 build material commercially referred to as V1R10A "HP PA12" available from HP Inc.

In some examples, selective solidification is achieved using heat in a thermal fusing additive manufacturing operation. This may comprise directional application of energy, for example using a laser or electron beam which results in solidification of build material where the directional energy is applied. In other examples, at least one print agent may be selectively applied to the build material, and may be liquid when applied. For example, a fusing agent (also termed a 'coalescence agent' or 'coalescing agent') may be selectively distributed onto portions of a layer of build material in a pattern derived from data representing a slice of a three-dimensional object to be generated (which may for example be derived from structural design data). The fusing agent may have a composition which absorbs energy such that, when energy (for example, heat) is applied to the layer, the build material heats up, coalesces and solidifies upon cooling, to form a slice of the three-dimensional object in accordance with the pattern. In other examples, coalescence may be achieved in some other manner.

According to one example, a suitable fusing agent may be an ink-type formulation comprising carbon black, such as, for example, the fusing agent formulation commercially referred to as V1Q60A "HP fusing agent" available from HP Inc. In one example such a fusing agent may comprise an infra-red light absorber. In one example such a fusing agent may comprise a near infra-red light absorber. In one example such a fusing agent may comprise a visible light absorber. In one example such a fusing agent may comprise a UV light absorber. Examples of print agents comprising visible light enhancers are dye based colored ink and pigment based colored ink, such as inks commercially referred to as CE039A and CE042A available from HP Inc.

In addition to a fusing agent, in some examples, a print agent may comprise a coalescence modifier agent, which acts to modify the effects of a fusing agent for example by reducing or increasing coalescence or to assist in producing a particular finish or appearance to an object, and such agents may therefore be termed detailing agents. In some examples, detailing agent may be used near edge surfaces of an object being printed for example to cool build material, or other reduce or prevent coalescence. According to one example, a suitable detailing agent may be a formulation commercially referred to as V1Q61A "HP detailing agent" available from HP Inc. A coloring agent, for example comprising a dye or colorant, may in some examples be used as a fusing agent or a coalescence modifier agent, and/or as a print agent to provide a particular color for the object.

As noted above, additive manufacturing systems may generate objects based on structural design data. This may involve a designer generating a three-dimensional model of an object to be generated, for example using a computer aided design (CAD) application. The model may define the solid portions of the object. To generate a three-dimensional object from the model using an additive manufacturing system, the model data can be processed to generate or derive slices of parallel planes of the model. Each slice may define a portion of a respective layer of build material that is to be solidified or caused to coalesce by the additive manufacturing system.

FIG. 1 is an example of a method, which may comprise a computer implemented method of modifying object model data. The object model data may be modified to compensate for anticipated departures from intended dimensions when generating an object.

In some examples, geometrical transformations may be used to modify object model data, for example to apply a geometrical compensation in order to compensate for anticipated departures from intended dimensions when generating an object.

For example, it may be the case that when a layer of build material is thicker than anticipated, an object may be generated to be larger than anticipated (or vice versa for thinner layers). In other examples, where an object is generated in a process which includes heat, additional build material may adhere to the object on generation. In one example, fusing agent may be associated with a region of the layer which is intended to fuse. However, when energy is supplied, build material of neighbouring regions may become heated and fuse to the outside of the object (in some examples, being fully or partially melted, or adhering to melted build material as powder). Therefore, a dimension of an object may be larger than the region(s) to which fusing agent is applied. In order to compensate for this effect, i.e. where it is anticipated that an object may tend to 'grow' during manufacture in this manner, the object volume as described in object model data may be reduced to compensate for such growth.

In other examples, objects may be smaller following object generation than is specified in object model data. For example, some build materials used to generate objects may shrink on cooling. Therefore, a geometrical compensation/transformation model may specify at least one geometrical compensation parameter to in turn specify how an object volume in object model data should be increased to compensate for the anticipated reduction in volume.

A particular object may be subject to mechanisms which result in growth and/or shrinkage, and the appropriate compensation to apply may be influenced by the different degrees to which an object may be affected by such processes.

The method comprises, in block 102, receiving, at least one processor, object model data representing at least a portion (in some examples, a slice) of a first object that is to be generated by an additive manufacturing apparatus by fusing build material within a fabrication chamber (which may also be referred to as a build volume). In some examples, the fusing process may comprise a thermal fusing process in which heat is applied. The data may for example be received over a communications link, or received from a memory or the like.

The object model data may for example comprise a Computer Aided Design (CAD) model, and/or may for example be a STereoLithographic (STL) data file. In some examples, the object model data may represent the object or object portion as a plurality of sub-volumes, wherein each sub-volume represents a region of the object which is individually addressable in object generation. In some examples herein, the sub-volumes may be referred to as voxels, i.e. three-dimensional pixels.

The method further comprises in block 104, determining, using at least one processor (which may be the same processor(s) as used to carry out block 102), an indication of an amount of fused build material in a region of the fabrication chamber which is to be below the region in which the first object is to be generated. In some examples, this may comprise an inspection of a 'virtual fabrication chamber', i.e. a model or description of the intended placement of objects in a fabrication batch. For example, it may be the case that a number of different objects are to be generated in a single build operation, and/or that build material may be solidified for some other reason (for example, in a calibration operation to determine a set point of heat sources or the like). In other examples, determining the indication may comprise a consideration of previously processed layers of build material. For example, it may be the case that the object model data referred to in block 102 is being considered after the start of an additive manufacturing operation in which other objects have already been generated, or are scheduled to be generated. The amount of fused build material may be determined, for example, as a volume, a portion and/or implicitly by reference to unfused build material.

Block 106 comprises determining, using at least one processor (which may be the same processor(s) as used to carry out block 102 and/or block 104), a dimensional compensation value to apply to the object model data representing the first object based on the determined amount of fused build material. As is set out in greater detail below, the amount of fused material (and therefore also, and conversely, amount of unfused material), and, in some examples, a time since a previous layer was processed, may be used to determine a compensation value which compensates for effects associated with the amount of solidified and unsolidified build material beneath an object.

Without wishing to be bound by theory, such effects may for example arise where build material shrinks on cooling. Where the proportion of underlying solidified material is different from one fabrication chamber region to another, the rate of cooling may also differ. This may result in 'subsidence' in a region of a fabrication chamber which cools more quickly, and where subsidence has occurred, a layer of fresh build material may be thicker, as the top surface of the layer may be controlled to be a certain level.

To consider this in greater detail, if a fabrication chamber were left to cool entirely, it may be the case that the solidified material would shrink more than the unsolidified build material, as it may be more dense when fused (although this may not be true of all materials). However, when unsolidified build material loses heat faster than solidified build material (as may be the case in some apparatus), it may be the cooling of the unsolidified build material which has the largest impact on layer thickness in the course of object generation operations. In some examples, determining the dimensional compensation value(s) may comprise applying at least one function to the determined amount of fused build material. Such functions may for example be retrieved from a memory, or received over a network or the like. Examples of such functions are set out in greater detail below.

In some examples, the dimensional compensation value(s) may describe a parametrical transformation, for example a geometrical transformation such as at least one of an offset and a scaling factor. While it could be the case that a dimensional compensation may indicate up to three scaling factors (one for each of the three orthogonal dimensions) and up to three offset values (one for each of the three orthogonal dimensions), in practice the mechanisms to be compensated for by the methods described herein disproportionately impact the vertical dimension during object generation. By convention, this vertical dimension is usually referred to as the z axis in the context of additive manufacturing, with the x and y axes defining the plane of a layer, and this convention will be adopted herein.

A scaling factor may be used to multiply all specified dimensions in the direction of an axis by a value, which may be greater than 1 in order to increase the dimensions and less than 1 to reduce the dimensions. An offset parameter may specify, for example by a specified distance (which may be specified in predefined units, for example addressable units such as pixels in a layer or voxels), an amount to add or remove from a surface of the object (or a perimeter within a layer). For example, a distance as measured in the direction of a normal from the object surface may be specified and the object may be eroded or dilated (i.e., inflated or enlarged) by this distance. Therefore, in order to compensate for an anticipated deformation in z, a vertical scaling factor and/or offset parameter may be used.

In some examples, where scaling is not indicated in a given dimension, the value of the scaling factor in relation to that dimension may be set to 1, and if no offset is indicated in a given dimension, the value of the offset parameter in relation to that dimension may be set to 0.

Block 108 comprises applying, using at least one processor (which may be the same processor(s) as used to carry out block 102, block 104 and/or block 106), the determined dimensional compensation value(s) to the object model data to derive or determine modified object model data. In some examples, the dimensional compensation value(s) may indicate at least one of a scaling factor and an offset parameter value. In some examples, where the object model data is described in terms of sub-volumes, such sub-volumes may be added or removed (or eroded) by application of the determined dimensional compensation value(s). Where the object is, for example, described by a mesh model or the like, the mesh model may be adjusted, expanded or contracted as set out by the determined dimensional compensation value(s) by application of the determined dimensional compensation value(s).

In other words, the method set out in FIG. 1 comprises applying a compensation parameter (which may be, at least, a compensation in the 'z', or vertical, axis), which is based (i.e. based at least in part) on an amount of fused/unfused build material in a region of the fabrication chamber which is to be below the region in which the first object is to be generated. This may be based on a mapping (for example, a look-up table, or an algorithm, or some other mapping) between (i) the amount of solidified (fused) and/or unsolidified (loose) material in a fabrication chamber which may impact a particular object and (ii) dimensional compensation values.

It may be noted that other compensation parameters, which may be derived from other compensation models, may also be used to derive the modified object data, for example to compensate for other potential deformations described above. For example, object location and/or proximity to other objects may be associated with deformation, and compensations for such anticipated deformations may be applied to the same object model data.

Figure 2:
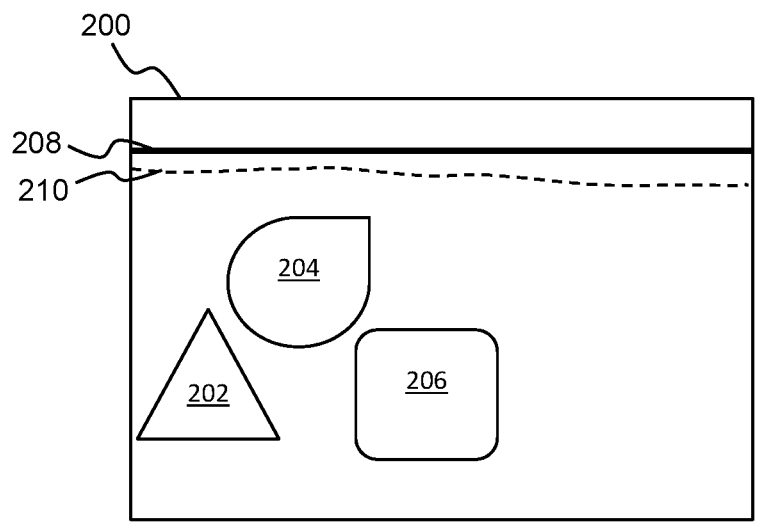
FIG. 2 shows a schematic representation of a fabrication chamber content.

FIG. 2 is a representation of a fabrication chamber 200 including a plurality of objects 202, 204, 206. To demonstrate an effect which may be compensated for in the method of FIG. 1, the objects are clustered to towards one side. A surface 208 indicates the top of the build material in the fabrication chamber. Such build material may be applied to provide a flat surface. For example, build material may be spread using a roller or scraper across the underlying bed of build material. In practice, the 'base' of the fabrication chamber may be lowered so that a fresh layer of build material is applied repeatedly at the same location in space as the content of the fabrication chamber becomes deeper, each layer effectively 'topping up' the fabrication chamber to the same level.

A dotted line 210 indicates the height of the penultimate layer of build material when the top layer is formed (where the layer height is exaggerated in the Figure to demonstrate the principle). This layer has suffered from 'subsidence' due to the build material shrinking as it cools. This effect is lessened where there are underlying objects as these tend to retain heat for longer, and therefore, at least in this example, for a continuously operated build operation, the shrinkage effect increases with the proportion of unsolidified build material below a given point in the fabrication chamber.

It can therefore be seen that the top layer is of inconsistent thickness. However, the algorithms used to produce object generation instructions will likely assume that the thickness is consistent, and may moreover make a particular assumption about the value of layer thickness. However, the first layer of an object generated to the right of the fabrication chamber 200 (where the layer thickness is greater) is likely to be thicker than the first layer of an object generated to the left of the fabrication chamber.

To compensate for this effect, the method of FIG. 1 proposes taking the amount of solidified/unsolidified material into account when generating a subsequent object.

In a particular example, a compensation value determined in block 106 (which is anything other than a unitary scaling factor, intended to have no effect) may be a scaling factor which reduces a height of a 'virtual' version of the first object (i.e. a value less than one). Such a virtual object may be represented by the object model data. Moreover, determining the dimensional compensation value to apply to the object model data may comprise determining a dimensional compensation value which reduces (i.e. becomes increasingly further from 1) with a decreasing proportion of fused build material in a region of the fabrication chamber which is to be below the region in which the first object is to be generated. This will increase the effect of the dimensional compensation value on the dimensions of the virtual object. Although a first virtual version of an object to be generated above a portion of the fabrication chamber which contains a high proportion of unsolidified material may be shorter than a second virtual version of the same object to be generated above a portion of the fabrication chamber which contains a low proportion of unsolidified material, the virtual layer of the first virtual version will correspond to thicker layers of build material, and therefore the objects generated may be closer to being the same height than if no compensation was applied.

Therefore, by applying the principles set out herein, an object with dimension(s) (and in particular at least one height) which more accurately corresponds to the intended dimensions(s) may be generated.

Figure 3:
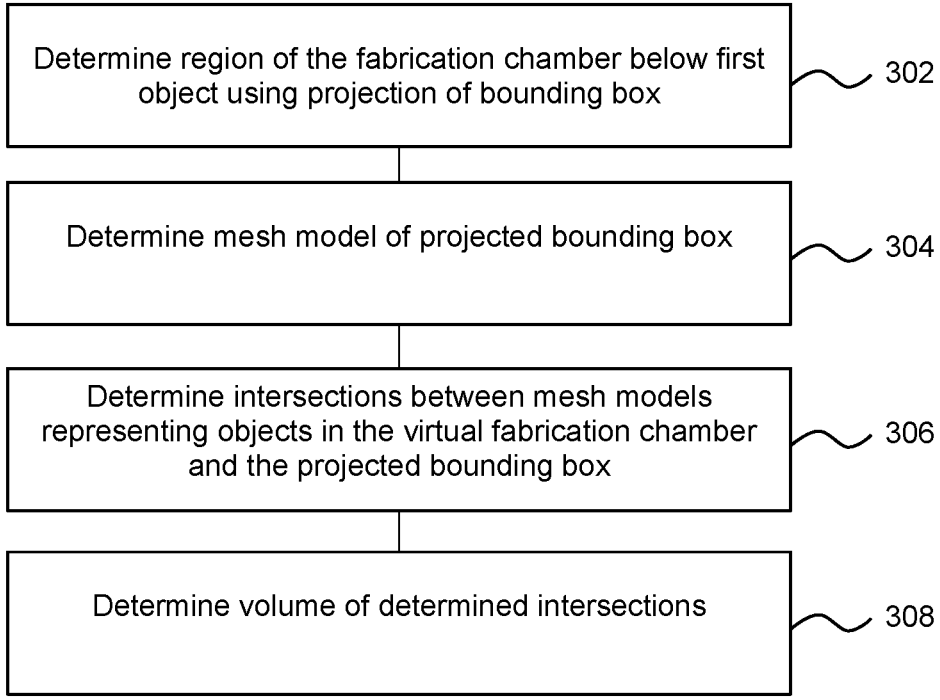
FIG. 3 is a flowchart of an example method for determining a volume within a fabrication chamber which is to be solidified in additive manufacturing.

FIG. 3 is an example of a method, which may be a computer implemented method, for determining an indication of an amount of fused build material in a region of the fabrication chamber which is to be below the region in which the first object is to be generated (or in other words, an example of a method for carrying out block 104 above).

In this example, block 302 comprises determining the region of the fabrication chamber which is to be below the region in which the first object is to be determined by projecting a bounding box enclosing a virtual first object through at least part of the height of a virtual fabrication chamber representing an intended fabrication chamber content. A 'bounding box' may be defined as an example of a particular geometrical shape such as a cuboid (which example is used herein) or a cylinder which encloses the object, and in some examples the smallest example of that shape which encloses the object (although in other examples, a minimum spacing between the object and the bounding box may be specified).

In other examples, the footprint of the object could be considered more accurately, for example on a voxel by voxel basis (or indeed a new area may be defined for each layer of the object, for example based on the footprint of that layer).

The part of the height of the virtual fabrication chamber through which the bounding box is projected may be predetermined as being the number of layers and/or distance which may impact the layer under consideration. As the effect is associated with cooling there may be a predetermined distance at which the object is substantially thermally isolated from a previously processed layer. For example, such thermal isolation may be associated with around 50 layers, or at least 100 layers, or some other value. The number of layers below the object which are considered may depend on a number of parameters, such as a print material used, a print mode, other print parameters such as a heating level, or any other parameter which may have an effect on how cooling occurs. Reducing the amount of the fabrication chamber which is considered may reduce the processing resources utilised in subsequent processing stages, although in other examples the full height of the fabrication chamber prior to generating the object may be considered.

In addition, in this example, the top of the projected bounding box is determined as coinciding with the layer which is closest to the intended first layer of object generation of the object under consideration which includes a solidified portion, and where that solidified portion coincides with the projection of the bounding box. In other words, any unoccupied layers between the first object and a solidified portion directly beneath it will be outside the projected bounding box (or more generally, outside the volume which is to be considered in determining the compensation). Again, this may reduce the processing resources utilised in subsequent processing stages.

Therefore, in an example the projected bounding box may be a cuboid having a top which is the smallest rectangle to enclose a vertical projection of the first object from three dimensions to two dimensions (or having the same size and shape as the base of the bounding box enclosing the object), the top being positioned at the layer closest to the object within that vertical projection which contains solidified material, and the base being a specified distance below the bottom layer for generation of the first object based on the maximum distance to a layer which may impact the layer thickness where the first object is to be generated. In other examples, the volume to be considered may be defined in some other way, for example comprising a projection of a bounding box having a different shape, or having a vertical profile modelled on the shape of each layer of the first object, and/or having a base and a top defined in some other way, including regions which extend through the height of the fabrication chamber to the base of the object, or to any layer below the object layer under consideration.

Block 304 comprises determining a mesh model of the projected bounding box, for example as a triangular mesh.

Block 306 comprises determining an indication of an amount of fused build material in the region of the fabrication chamber which is to be below the region in which the first object is to be generated by determining any intersections between mesh models representing objects in the virtual fabrication chamber and the projected bounding box. The intersection of the projection of the bounding box and 'virtual' object(s) may be determined using established techniques, such as global (volumetric) and local (surface oriented) techniques.

Block 308 comprises determining the volume within the determined intersections. In this case, the intersection(s) represent the solidified volume. The unsolidified volume may be determined by subtracting this value from the volume of the projected bounding box.

While such mesh intersections are computationally efficient, other methods may be used to determine the solidified/unsolidified volume. For example, if the virtual fabrication chamber has been 'voxelised', a count of the voxels which correspond to parts of object(s) may be carried out and used to determine the volume to be solidified.

In other examples, the amount of unoccupied/unsolidified material beneath the object may be determined directly (and, in some examples, the volume to be fused may be determined therefrom).

Figure 4:
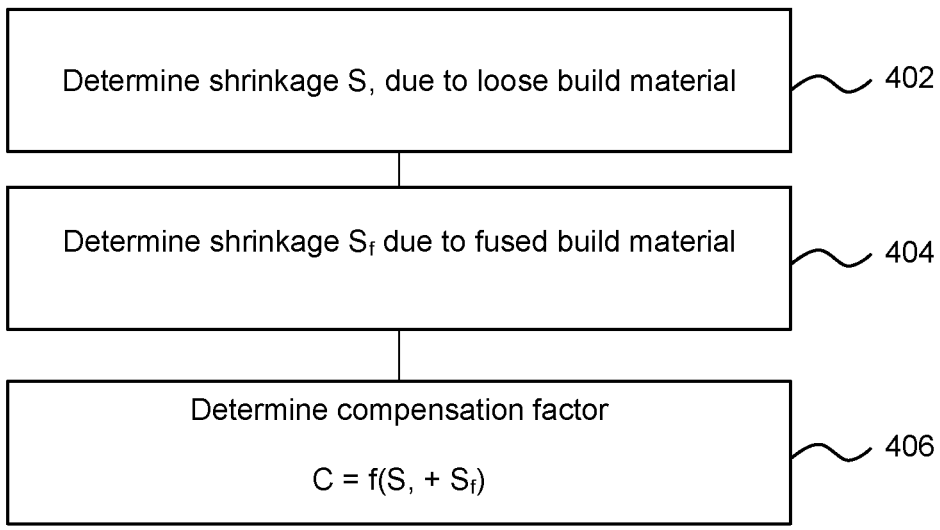
FIG. 4 is a flowchart of an example method for determining a compensation parameter.

FIG. 4 is an example of a method, which may be a computer implemented method, for determining a dimensional compensation value to apply to the object model data representing the first object based on the determined amount of fused build material (or in other words, an example of a method for carrying out block 106 above).

In this example determining the dimensional compensation value to apply to the object model data comprises determining a first compensation component associated with an amount of fused build material in a region of the fabrication chamber which is to be below the region in which the first object is to be generated and a second compensation component associated with an amount of unfused build material in a region of the fabrication chamber which is to be below the region in which the first object is to be generated. The aim of the method is to compute a shrinkage compensation parameter (in this example, a scaling factor, (C) based on a function, f, of the overall shrinkage (S) of previous layers:

$$C = f(S) \tag{1}$$

S is modelled as having two components, a first component which depends on the shrinkage of non-fused, or loose build material $S_l$ and a second component which depends on the shrinkage from fused build material $S_f$:

$$S = S_f + S_l \tag{2}$$

Block 402 comprises determining $S_l$ as a function g of the distance, d, from the base layer of the first object to the closest solidified portion which is in the region which is below the first object (which may be the layer at the top of the bounding box described above), and time, t since the layer having the closest solidified portion:

$$S_l = g(d, t) \tag{3}$$

Block 404 comprises determining $S_f$ as a function h of time, t, and the solidified content m (for example, based on the volume of the intersections determined as described in relation to block 308 above, or based on a 'voxel' count, or determined in some other way) between from d to the minimum layer ($min_z$) that affects to current layer. In some examples, this may be the volume contained in the bounding box described in relation to FIG. 3:

$$S_f = h(m(d - min_z), t) \tag{4}$$

In the case that there is no content below the first object and above the minimum layer considered (or in other words, d is greater than or equal to $min_z$) then the only contributor to shrinkage is the un-fused or loose build material (i.e. the amount of fused material in the region below which the region in which the first object is to be generated may be zero). In some such examples, d may be set to $min_z$.

Then, in block 406, the compensation parameter is determined as a function f of the sum of $S_l$ and $S_f$.

The functions f, g and h, or at least one parameter thereof, may be predetermined, for example derived experimentally (for example based on one or more calibration build operations) or using theory. A particular version of f, g or h may be associated with any additive manufacturing parameter. The parameter(s) may be any parameter which may have an impact on dimensional inaccuracy. For example, the parameter(s) may comprise any, or any combination of, environmental conditions, object generation apparatus, object generation material composition, object cooling profile, print apparatus class, specific apparatus used, the build material used or parameters thereof, the print agents used, operational parameters such as heat used and the like).

While this example considers just the some previous layers in determining $S_l$ and $S_f$, and this has been found to contribute to the accuracy with which objects may be generated, more complex models may be used in other examples, such as the proportion of solidified material in each layer. However, the use of a relatively simple model may reduce the processing resources utilised.

In some examples, at least one function, or at least one parameter thereof, may be 'learnt' using machine learning techniques based on a training dataset. A relationship between dimensional inaccuracies of objects and/or layer thicknesses and the proportions of solidified/unsolidified material in a fabrication chamber may be inferred from a training dataset including measurements of generated objects.

For example, the training dataset may comprise data gathered from at least one additive manufacturing process, which may for example use the same class of additive manufacturing process (for example, all the processes may be carried out using selective laser sintering, or all the processes may be carried out using a fusing agent printed onto a layer of build material, or all the processes may be carried out using some other common additive manufacturing process). In other examples, all the processes may be carried out using a particular class of apparatus. In some examples, all the processes may be carried out using the same instance of an additive manufacturing apparatus (i.e. a particular 3D printer).

The parameters of the functions may be determined, for example, using curve fitting, machine learning and/or artificial intelligence techniques. In some examples, this may comprise, for example, carrying out a data fitting and/or function approximation (e.g. minimisation problems) for data interpolation operations on the training dataset.

As noted above, in some examples, there may be a plurality of versions of at least one of the functions f, g and h, which may relate to different object generation parameter values.

Figure 5:
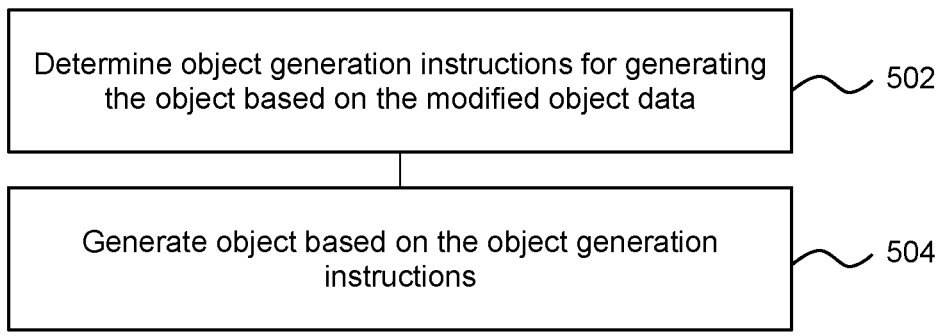
FIG. 5 is a flowchart of an example method of object generation.

FIG. 5 is an example method of generating an object, which may follow the method of FIG. 1.

Block 502 comprises determining object generation instructions (or 'print instructions') for generating the object based on the modified object data derived in block 108. The object generation instructions in some examples may specify an amount of print agent to be applied to each of a plurality of locations on a layer of build material. For example, generating object generation instructions may comprise determining 'slices' of a virtual fabrication chamber, and rasterising these slices into pixels (or voxels, i.e. three-dimensional pixels). An amount of print agent (or no print agent) may be associated with each of the pixels/voxels. For example, if a pixel relates to a region of a fabrication chamber which is intended to solidify, the object generation instructions may be determined to specify that fusing agent should be applied to a corresponding region of build material in object generation. If however a pixel relates to a region of the fabrication chamber which is intended to remain unsolidified, then object generation instructions may be determined to specify that no agent, or a coalescence modifying agent such as a detailing agent, may be applied thereto. In addition, the amounts of such agents may be specified in the determined instructions and these amounts may be determined based on, for example, thermal considerations and the like.

Block 504 comprises generating an object based on the object generation instructions. For example, such an object may be generated layer by layer. For example, this may comprise forming a layer of build material, applying print agents, for example through use of 'inkjet' liquid distribution technologies in locations specified in the object generation instructions for an object model slice corresponding to that layer using at least one print agent applicator, and applying energy, for example heat, to the layer. Some techniques allow for accurate placement of print agent on a build material, for example by using printheads operated according to inkjet principles of two dimensional printing to apply print agents, which in some examples may be controlled to apply print agents with a resolution of around 600 dpi, or 1200 dpi. A further layer of build material may then be formed and the process repeated, for example with the object generation instructions for the next slice.

By generating an object after applying the method of FIG. 1, the object once formed may end up being closer to an intended size.

While in this example, the modification to the data was made before object generation instructions were determined, this need not be the case in all examples, and in other examples object generation instructions may be determined then modified.

As mentioned above, in some examples, the methods set out herein may be combined with other methods of object model modification, which may include other object compensation models. However, there may be additional factors considered. For example, a modification function may be employed in the vicinity, or locality, of small features. An erosion of such small features may result in an unacceptable reduction in their size, either obliterating the feature or rendering it too small to fuse or too delicate to survive cleaning operations. For example, if a feature has a dimension of around 0.5 mm, this may correspond to 12 voxels at 600 dpi. If three or four voxels are eroded from the side of such a small feature, it will lose approximately 50 to 60% of its cross-section, reducing its size to less than 0.3 mm. Such a feature may be too small to survive cleaning operations. Thus, in some examples, other functions may be used to ensure that small features are preserved.

Figure 6:
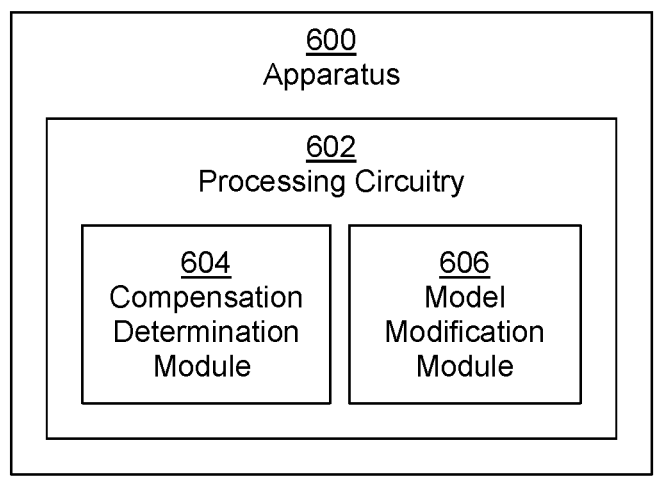
FIGS. 6 and 7 are simplified schematic drawings of example apparatus for additive manufacturing.

FIG. 6 shows an apparatus 600 comprising processing circuitry 602. The processing circuitry 602 comprises a compensation determination module 604, and a model modification module 606.

In use of the apparatus 600, the compensation determination module 604 determines a vertical dimensional transformation (for example, a scaling factor and/or offset parameter) for a virtual object representing a first object to be generated using additive manufacturing. The vertical dimensional transformation is based (i.e. based at least in part) on an indication of fused and unfused build material amounts in a region of the fabrication chamber which is to be below the region in which the first object is to be generated. In some examples, the compensation determination module 60 may determine an indication of a time difference between generating the first object and a fusing operation associated with the region of the fabrication chamber which is to be below the region in which the first object is to be generated and may determine the vertical dimensional transformation for the virtual object representing the first object based (i.e. based at least in part) on an indication of the time difference. For example, the compensation determination module 604 may utilise the methods described in relation to block 102-106, or the methods described in relation to any of the blocks of FIG. 3 or 4 above.

In use of the apparatus 600, the model modification module 606 modifies the virtual object using the vertical dimensional transformation. The vertical dimensional transformation may comprise a vertical scaling factor. The model modification module 606 may utilise the methods described in relation to block 108 above.

Figure 7:
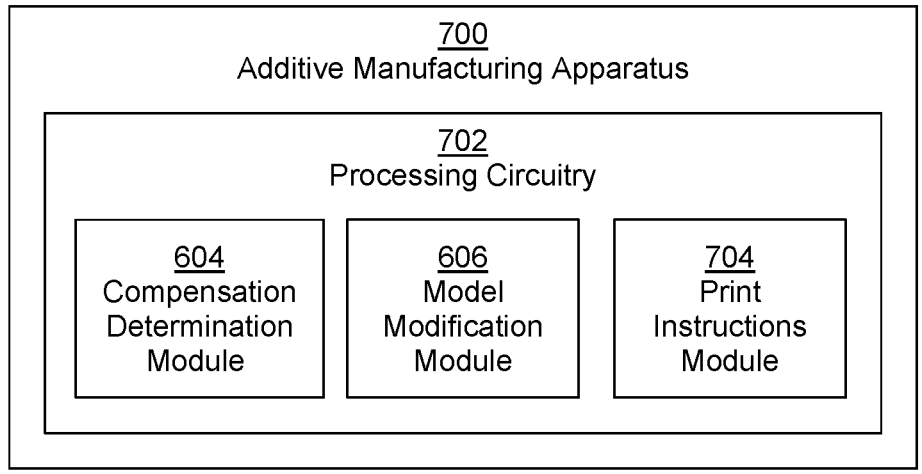

FIG. 7 shows additive manufacturing apparatus 700 to generate an object comprising processing circuitry 702. The processing circuitry 702 comprises the compensation determination module 604 and the model modification module 606 of FIG. 6 and further comprises a print instructions module 704.

The print instructions module 704, in use of the additive manufacturing apparatus 700, determines print instructions for generating the object from data representing the modified virtual object. The print instructions (or object generation instructions) may, in use thereof, control the additive manufacturing apparatus 700 to generate each of a plurality of layers of the object. This may for example comprise specifying area coverage(s) for print agents such as fusing agents, colorants, detailing agents and the like. In some examples, object generation parameters are associated with object model sub-volumes (voxels or pixels). In some examples, the print instructions comprise a print agent amount associated with sub-volumes. In some examples, other parameters, such as any, or any combination of heating temperatures, build material choices, an intent of the print mode, and the like, may be specified. In some examples, halftoning may be applied to determine where to place fusing agent or the like.

The additive manufacturing apparatus 700, in use thereof, generates the object in a plurality of layers (which may correspond to respective slices of an object model) according to the print instructions. The additive manufacturing apparatus 700 may for example generate an object in a layer-wise manner by selectively solidifying portions of layers of build material. The selective solidification may in some examples be achieved by selectively applying print agents, for example through use of 'inkjet' liquid distribution technologies, and applying energy, for example heat, to the layer. The additive manufacturing apparatus 700 may comprise additional components not shown herein, for example any or any combination of a fabrication chamber, a print bed, printhead(s) for distributing print agents, a build material distribution system for providing layers of build material, energy sources such as heat lamps and the like.

The processing circuitry 602, 702 or the modules thereof may carry out any or any combination of the blocks of FIG. 1, 3 or 4 and/or block 502 of FIG. 5.

Figure 8:
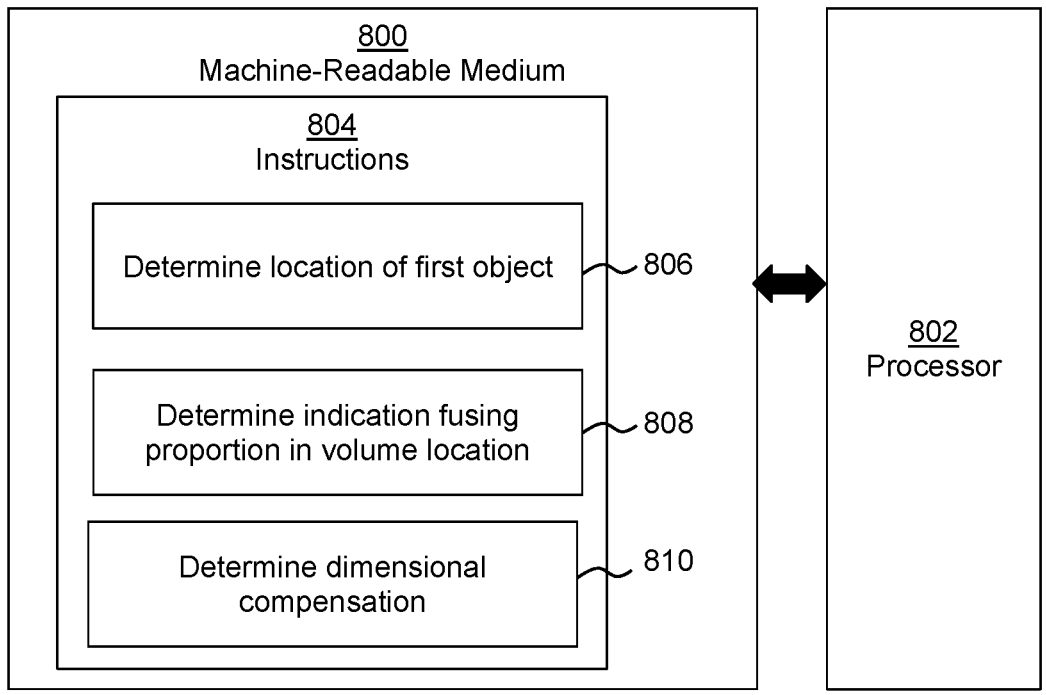
FIG. 8 is a simplified schematic drawing of an example machine-readable medium associated with a processor.

FIG. 8 shows a tangible machine-readable medium 800 associated with a processor 802. The machine-readable medium 800 comprises instructions 804 which, when executed by the processor 802, cause the processor 802 to carry out tasks. In this example, the instructions 804 comprise instructions 806 to cause the processor 802 to determine a location (a first location) within a fabrication chamber for a first object (which is to be generated within the fabrication chamber), instructions 808 to cause the processor 802 to determine an indication of a build material fusing proportion in a second volume of the fabrication chamber, wherein the volume is to be below the location (the first location) in an object generation operation, and instructions 810 to cause the processor 802 to determine a dimensional compensation to apply to data representing the first object based (i.e. based at least in part) on the determined indication.

In some examples, determining the dimensional compensation comprises determining a first compensation component associated with fused build material and a second compensation component associated with unfused build material.

In some examples, the instructions when executed cause the processor 802 to carry out any or any combination of the blocks of FIG. 1, 3 or 4 and/or block 502 of FIG. 5. In some examples, the instructions may cause the processor 802 to act as any part of the processing circuitry 602, 702 of FIG. 6 or FIG. 7.

Examples in the present disclosure can be provided as methods, systems or machine-readable instructions, such as any combination of software, hardware, firmware or the like. Such machine-readable instructions may be included on a computer readable storage medium (including but not limited to disc storage, CD-ROM, optical storage, etc.) having computer readable program codes therein or thereon.

The present disclosure is described with reference to flow charts and/or block diagrams of the method, devices and systems according to examples of the present disclosure. Although the flow diagrams described above show a specific order of execution, the order of execution may differ from that which is depicted. Blocks described in relation to one flow chart may be combined with those of another flow chart. It shall be understood that each block in the flow charts and/or block diagrams, as well as combinations of the blocks in the flow charts and/or block diagrams can be realized by machine-readable instructions.

The machine-readable instructions may, for example, be executed by a general purpose computer, a special purpose computer, an embedded processor or processors of other programmable data processing devices to realize the functions described in the description and diagrams. In particular, a processor or processing apparatus may execute the machine-readable instructions. Thus functional modules of the apparatus (such as the compensation determination module 604, the model modification module 606 and/or the print instructions module 704) may be implemented by a processor executing machine-readable instructions stored in a memory, or a processor operating in accordance with instructions embedded in logic circuitry. The term 'processor' is to be interpreted broadly to include a CPU, processing unit, ASIC, logic unit, or programmable gate array etc. The methods and functional modules may all be performed by a single processor or divided amongst several processors.

Such machine-readable instructions may also be stored in a computer readable storage that can guide the computer or other programmable data processing devices to operate in a specific mode.

Machine-readable instructions may also be loaded onto a computer or other programmable data processing devices, so that the computer or other programmable data processing devices perform a series of operations to produce computer-implemented processing, thus the instructions executed on the computer or other programmable devices realize functions specified by block(s) in the flow charts and/or in the block diagrams.

Further, the teachings herein may be implemented in the form of a computer software product, the computer software product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the spirit of the present disclosure. It is intended, therefore, that the method, apparatus and related aspects be limited by the scope of the following claims and their equivalents. It should be noted that the above-mentioned examples illustrate rather than limit what is described herein, and that those skilled in the art will be able to design many alternative implementations without departing from the scope of the appended claims. Features described in relation to one example may be combined with features of another example.

The word "comprising" does not exclude the presence of elements other than those listed in a claim, "a" or "an" does not exclude a plurality, and a single processor or other unit may fulfil the functions of several units recited in the claims. 'Based on' means based at least in part on.

The features of any dependent claim may be combined with the features of any of the independent claims or other dependent claims.

The invention claimed is:

1. A method comprising:
receiving, by a processor, object model data representing a first object to be generated by an additive manufacturing apparatus by depositing and selectively fusing first powder build material layers within a fabrication chamber above a second object to be or that has already been generated by the additive manufacturing apparatus by depositing and selectively fusing second powder build material layers within the fabrication chamber;
determining, by the processor, an indication of an amount of fused build material of the second object in a second region of the fabrication chamber below a first region in which the first object is to be generated;
determining, by the processor, a dimensional compensation value to apply to the object model data based on the determined indication, the dimensional compensation value is determined to compensate for inconsistency in thickness of the first powder build material layers when being deposited due to the amount of fused build material of the second object in the second region of the fabrication chamber below the first region;
applying, by the processor, the determined dimensional compensation value to the object model data to derive modified object model data; and
causing, by the processor, the additive manufacturing apparatus to generate the first object according to the modified object model data.

2. The method according to claim 1, wherein determining the dimensional compensation value comprises:
determining a first compensation component associated with the amount of fused build material in the second region of the fabrication chamber below the first region; and
determining a second compensation component associated with an amount of unfused build material in the second region of the fabrication chamber below the first region.

3. The method according to claim 1, wherein the dimensional compensation value is a scaling factor of less than one,
and wherein the dimensional compensation value decreases with a decreasing proportion of fused build material in the second region of the fabrication chamber below the first region.

4. The method according to claim 1, wherein the dimensional compensation value is determined based on a time difference between when the first object is to be generated and when build material in the second region of the fabrication chamber below the first region is to be or already was selectively fused.

5. The method according to claim 1, wherein the indication of the amount of fused build material in the second region of the fabrication chamber below the first region is an indication of the amount of fused build material in the second region that is within a predetermined distance of the first region.

6. The method according to claim 1, further comprising:
determining, by the processor, the second region of the fabrication chamber below the first region by projecting a bounding box enclosing a virtual first object corresponding to the first object through at least part of a height of a virtual fabrication chamber corresponding to the fabrication chamber and representing an intended fabrication chamber content of the first object and the second object.

7. The method according to claim 6, further comprising:
determining, by the processor, a first mesh model of the portion of the virtual fabrication chamber within the projected bounding box,
wherein the indication of the amount of fused build material in the second region of the fabrication chamber below the first region is determined by determining an intersection between the first mesh model and a second mesh model representing the second object in the virtual fabrication chamber, and determining a volume of the intersection.

8. A system comprising:
a processor; and
a memory storing instructions executable by the processor to:
receive object model data representing a first object to be generated by an additive manufacturing apparatus by depositing and selectively fusing first powder build material layers within a fabrication chamber above a second object to be or that has already been generated by the additive manufacturing apparatus by depositing and selectively fusing second powder build material layers within the fabrication chamber;
determine an indication of an amount of fused build material of the second object in a second region of the fabrication chamber below a first region in which the first object is to be generated;
determine a dimensional compensation value to apply to the object model data based on the determined indication, the dimensional compensation value is determined to compensate for inconsistency in thickness of the first powder build material layers when being deposited due to the amount of fused build material of the second object in the second region of the fabrication chamber below the first region;
apply the determined dimensional compensation value to the object model data to derive modified object model data; and
cause the additive manufacturing apparatus to generate the first object according to the modified object model data.

9. The system according to claim 8, wherein determination of the dimensional compensation value includes:
determining a first compensation component associated with the amount of fused build material in the second region of the fabrication chamber below the first region; and
determining a second compensation component associated with an amount of unfused build material in the second region of the fabrication chamber below the first region.

10. The system according to claim 8, wherein the dimensional compensation value is a scaling factor of less than one,
and wherein the dimensional compensation value decreases with a decreasing proportion of fused build material in the second region of the fabrication chamber below the first region.

11. The system according to claim 8, wherein the dimensional compensation value is determined based on a time difference between when the first object is to be generated and when build material in the second region of the fabrication chamber below the first region is to be or already was selectively fused.

12. The system according to claim 8, wherein the indication of the amount of fused build material in the second region of the fabrication chamber below the first region is an indication of the amount of fused build material in the second region that is within a predetermined distance of the first region.

13. The system according to claim 8, wherein the instructions are executable by the processor to further:
  determine the second region of the fabrication chamber below the first region by projecting a bounding box enclosing a virtual first object corresponding to the first object through at least part of a height of a virtual fabrication chamber corresponding to the fabrication chamber and representing an intended fabrication chamber content of the first object and the second object; and
  determine a first mesh model of the portion of the virtual fabrication chamber within the projected bounding box,
  wherein the indication of the amount of fused build material in the second region of the fabrication chamber below the first region is determined by determining an intersection between the first mesh model and a second mesh model representing the second object in the virtual fabrication chamber, and determining a volume of the intersection.

14. A non-transitory computer-readable data storage medium storing program code executable by a processor to perform processing comprising:
  receiving object model data representing a first object to be generated by an additive manufacturing apparatus by depositing and selectively fusing first powder build material layers within a fabrication chamber above a second object to be or that has already been generated by the additive manufacturing apparatus by depositing and selectively fusing second powder build material layers within the fabrication chamber;
  determining an indication of an amount of fused build material of the second object in a second region of the fabrication chamber below a first region in which the first object is to be generated;
  determining a dimensional compensation value to apply to the object model data based on the determined indication, the dimensional compensation value is determined to compensate for inconsistency in thickness of the first powder build material layers when being deposited due to the amount of fused build material of the second object in the second region of the fabrication chamber below the first region;
  applying the determined dimensional compensation value to the object model data to derive modified object model data; and
  causing the additive manufacturing apparatus to generate the first object according to the modified object model data.

15. The non-transitory computer-readable data storage medium according to claim 14, wherein determining the dimensional compensation value comprises:
  determining a first compensation component associated with the amount of fused build material in the second region of the fabrication chamber below the first region; and
  determining a second compensation component associated with an amount of unfused build material in the second region of the fabrication chamber below the first region.

16. The non-transitory computer-readable data storage medium according to claim 14, wherein the dimensional compensation value is a scaling factor of less than one,
  and wherein the dimensional compensation value decreases with a decreasing proportion of fused build material in the second region of the fabrication chamber below the first region.

17. The non-transitory computer-readable data storage medium according to claim 14, wherein the dimensional compensation value is determined based on a time difference between when the first object is to be generated and when build material in the second region of the fabrication chamber below the first region is to be or already was selectively fused.

18. The non-transitory computer-readable data storage medium according to claim 14, wherein the indication of the amount of fused build material in the second region of the fabrication chamber below the first region is an indication of the amount of fused build material in the second region that is within a predetermined distance of the first region.

19. The non-transitory computer-readable data storage medium according to claim 14, wherein the processing further comprises:
  determining the second region of the fabrication chamber below the first region by projecting a bounding box enclosing a virtual first object corresponding to the first object through at least part of a height of a virtual fabrication chamber corresponding to the fabrication chamber and representing an intended fabrication chamber content of the first object and the second object; and
  determining a first mesh model of the portion of the virtual fabrication chamber within the projected bounding box,
  wherein the indication of the amount of fused build material in the second region of the fabrication chamber below the first region is determined by determining an intersection between the first mesh model and a second mesh model representing the second object in the virtual fabrication chamber, and determining a volume of the intersection.

* * * * *